United States Patent [19]
Hylén

[11] Patent Number: 5,649,259
[45] Date of Patent: Jul. 15, 1997

[54] IMAGE MODIFIERS FOR USE IN PHOTOGRAPHY

[76] Inventor: Steven H. L. Hylén, 67 Catamount Rd., Fairfield, Conn. 06430

[21] Appl. No.: 526,990

[22] Filed: Sep. 12, 1995

[51] Int. Cl.⁶ .................................................. G03B 11/00
[52] U.S. Cl. ...................... 396/544; 396/316; 396/340; 396/439
[58] Field of Search .................................. 354/108, 202, 354/291, 295, 296, 125, 77; 352/85; 396/544, 340, 316, 545, 439, 337

[56] References Cited

U.S. PATENT DOCUMENTS

| | | | |
|---|---|---|---|
| 1,396,035 | 11/1921 | Gaisman | 354/108 |
| 3,665,828 | 5/1972 | Reiter | 354/202 |
| 3,916,423 | 10/1975 | Ueda et al. | 354/108 |
| 4,342,510 | 8/1982 | Guillaume | 354/216 |
| 4,533,224 | 8/1985 | Ou | 354/77 |
| 5,164,765 | 11/1992 | Strobel et al. | 355/71 X |
| 5,247,320 | 9/1993 | Kay | 354/125 |
| 5,550,610 | 8/1996 | DeMarco | 354/295 |

*Primary Examiner*—D. Rutledge
*Attorney, Agent, or Firm*—Darby & Darby

[57] ABSTRACT

In a first embodiment of the invention, a transparent plate is mounted at the film plane within a camera. The transparent plate includes a translucent diffusion pattern which diffuses incoming light rays reflected from the subject and effectively repositions them in a controlled manner prior to the light exposing the film. Proposed diffusion patterns may alter the light rays to create characteristics indicative of various types of paintings.

In another embodiment of the invention, the transparent plate is mounted in a film cartridge.

In another embodiment of the invention, a length of plastic film (a pattern strip) is positioned adjacent to a similar length of photographic film (film strip). An appropriate translucent diffusion pattern is provided onto one surface of the pattern strip, along its entire length. Both strips are rolled into a conventional 35 mm film canister and dispensed simultaneously, as needed (within the camera) so that each frame of film has a separate mask in front of it, at the film gate of the camera.

In another embodiment of the invention, a transparent plate having a translucent diffusion pattern is positioned between the main lens of the camera, and the camera body. In this arrangement, a correcting lens is required to bring the pattern of the particular pattern into sharp focus with the image at the film plane to be exposed on film.

15 Claims, 11 Drawing Sheets

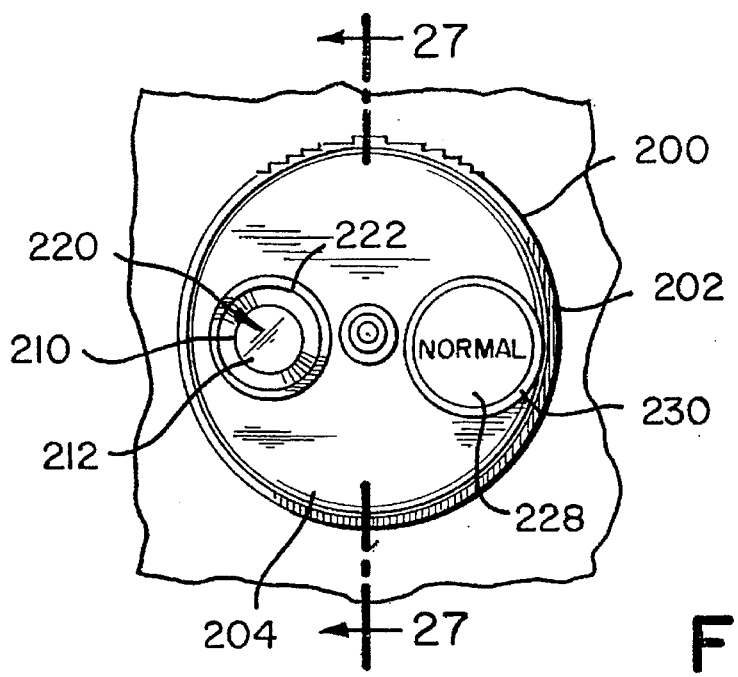
FIG. 26
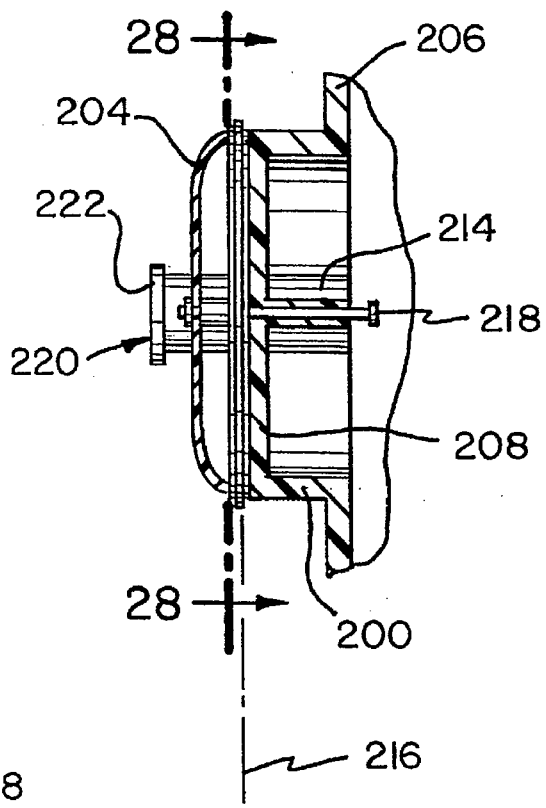
FIG. 27
FIG. 28
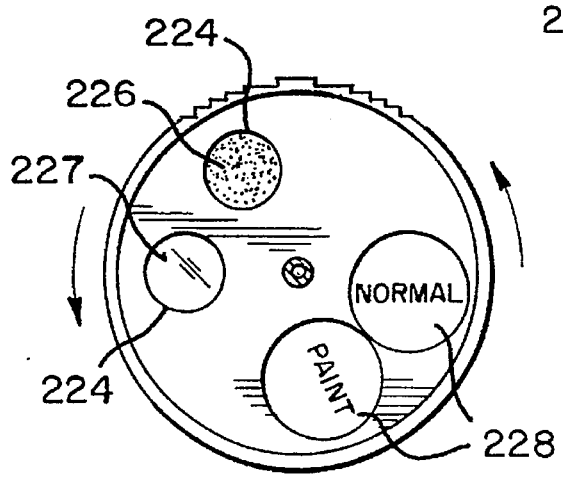

IMAGE MODIFIERS FOR USE IN PHOTOGRAPHY

FIELD OF THE INVENTION

This invention relates generally to photographic image modifying equipment, and more particularly, to photographic image modifiers for introducing to a photographic negative during its exposure image a special effect such as an effect which is indicative of a painting.

BACKGROUND OF THE INVENTION

The art of creating special effects in the field of photography has been very active in the past and continues to grow with the increasing interest in photography and the desire for more interesting visual illusions. Devices have been developed, for example, to alter an image prior to or during its exposure on film. Typically, these devices are attached at the end of the lens of a camera, and directly interfere with the light prior to it reaching the film. The alterations or effects applied to the incoming light vary from common color-filtering changes to superimposing "sub-images" onto the same frame of film recording the "real" image. For example, placing an opaque, pre-shaped matte in front of a portion of the incoming light will block a correspondingly shaped portion of the film, resulting in an unexposed area of film which may be later "filled-in" with another image to create one desired illusion or effect. Similar diffusion mattes are used in still photography to produce gradually increasingly under-exposed boarders to a frame of film being exposed, creating a vignette boarder.

Conventional devices have also been used to superimpose an image of characters such as a date or other alpha-numeric information onto a portion of an image on a frame of film. Typically, these devices, such as the device disclosed in U.S. Pat. No. 1,504,959 issued to Leschbrandt, include a translucent plate (or ribbon) having, for example, opaque characters positioned at the film plane in a camera. The plate of characters is aligned adjacent to and in front of the surface of the film. Light from an external source or light generated from within the camera is used to superimpose selected characters of the plate onto a portion of the film.

U.S. Pat. No. 3,916,423, issued to Ueda et at. discloses a device for transposing information (characters, lines or designs) onto the surface of film during exposure of the film to an image. A transparent plate having an opaque mask is attached to a film cartridge in front of and adjacent to a frame of film. During exposure, a portion of the light from the image is blocked by the opaque mask located on the transparent plate prior to the light reaching and exposing the film. The result is under-exposed regions of the film (negative) corresponding to the particular shape of the opaque mask. When the negative is used to expose a positive print, the shape of the particular opaque mask will be positively transposed in the form of dark overexposed regions in the final print.

One limitation with these prior art special effects devices is that they all rely on blocking a portion of the incoming light prior to the light reaching the film. Although many effects may be created using the prior art methods employing opaque masks, many other effects require more subtle, diffusion methods.

It is accordingly an object of the invention to provide a special effects device for use in photography which overcomes the limitations of the prior art.

It is another object of the invention to provide such a device which enables a photographer to transform photographic images into images having characteristics inherent in paintings of such images.

It is another object of the invention to provide such a device which enables a photographer to superimpose a translucent mask including random crackling onto an image, resulting in a final print which includes the craquelure characteristics of aged oil paintings.

It is another object of the invention to provide such a device which enables a photographer to superimpose a translucent mask onto an image to transpose the image to one having characteristics inherent in a water color painting.

It is another object of the invention to provide such a device which enables a photographer to superimpose a translucent mask onto an image to transpose the image to one having characteristics inherent in an oil pallet-knife type painting.

SUMMARY OF THE INVENTION

In a first embodiment, the invention comprises a transparent plate mounted at the film plane within a camera. The transparent plate has a translucent diffusion pattern which diffuses incoming light rays reflected from the subject and effectively repositions them in a controlled manner prior to their exposure on film. Proposed diffusion patterns may alter the light rays to create characteristics indicative of various types of paintings.

In another embodiment of the invention, the transparent plate having the translucent diffusion pattern is mounted in a film cartridge.

In yet another embodiment of the invention, a length of plastic film (a pattern strip) is positioned adjacent to a similar length of photographic film (film strip). An appropriate translucent diffusion pattern is provided onto one surface of the pattern strip, along its entire length. Both strips are rolled into a conventional 35 mm film canister and dispensed simultaneously, as needed (within the camera) so that each frame of film has a separate mask in front of it, at the film gate of the camera.

In another embodiment of the invention, a transparent plate having a translucent diffusion pattern is positioned between the main lens of the camera, and the camera body. In this arrangement, a correcting lens is required to bring the pattern of the particular pattern into sharp focus with the image at the film plane to be exposed on film.

BRIEF DESCRIPTION OF THE DRAWINGS

FIG. 2b is a side view of the optical modifier of FIG. 2a;

FIG. 26 is a front view of an optical modifier turret assembly, in accordance with another embodiment of the invention;

FIG. 27 is a sectional side view of the modifier shown in FIG. 26, taken along the lines 27—27; and FIG. 28 is partially sectional front view of a modifier disc, taken along the lines 28—28 of FIG. 27.

DETAIL DESCRIPTION OF THE PREFERRED EMBODIMENT

Figure 1:
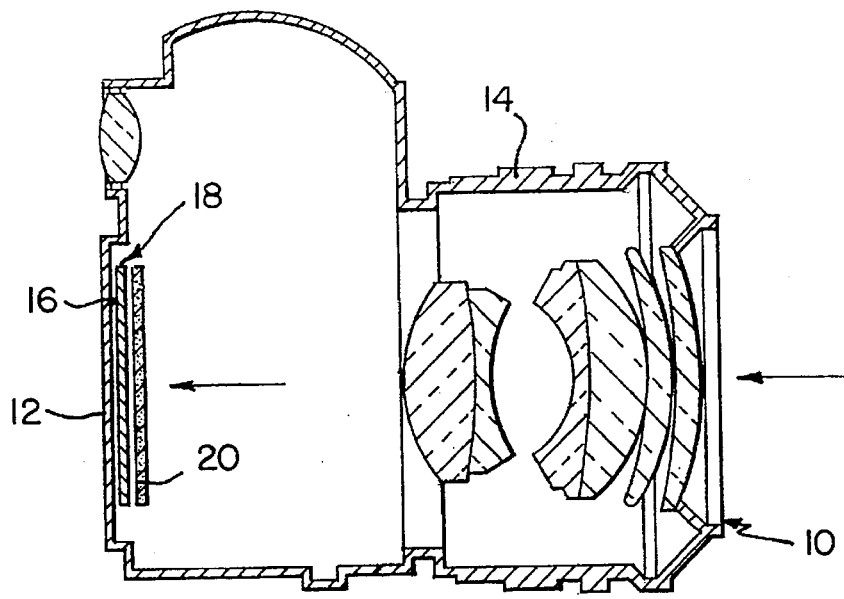
FIG. 1 is a sectional side view of a single lens reflex (SLR) camera showing a film strip, an optical modifier plate, a film plane, a lens assembly, and incident light rays, in accordance with a first embodiment of the invention.
Figure 2A:
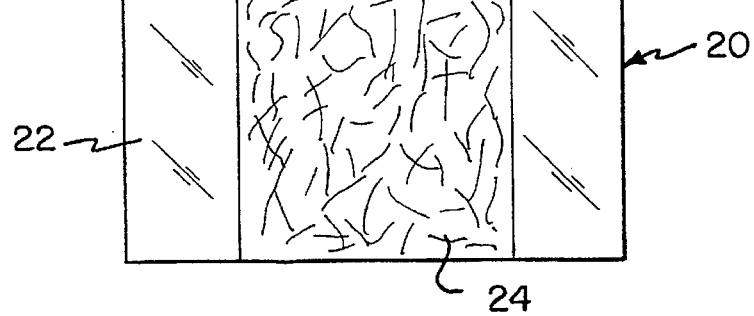
FIG. 2a is a plan view of an optical modifier, in accordance with another embodiment of the invention.
Figure 2B:
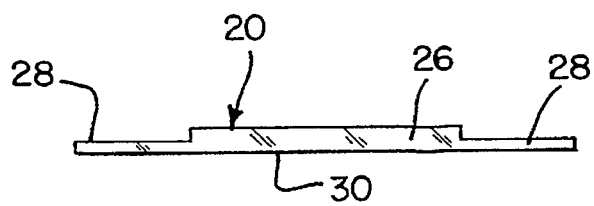
Figure 2C:
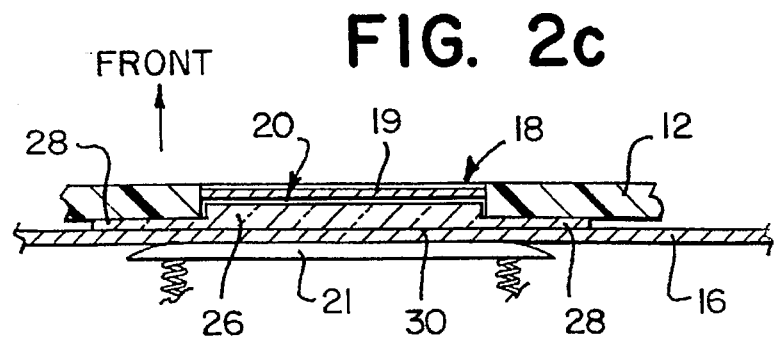
FIG. 2c is a cross sectional side view of a camera film gate showing the optical modifier of FIG. 2b in position within the film gate.

Referring to FIG. 1, a camera 10 (an SLR) is shown having a camera body 12, a lens assembly 14 attached to a front side of the camera body 12, and a frame of film 16 shown in cross section at a film gate 18 (see also, FIG. 2c). An optical modifier 20, in accordance with a first embodiment of the invention, is positioned in front of the film 16 within the film gate 18. The specific structures of both the film gate 18 and the shutter mechanism 19 of the camera 10 are conventional and are therefore not shown in full detail. In this embodiment, the shutter mechanism 19 is located in front of (i.e., closer to) the lens 14, the modifier 20 and, of course, the frame of film 16.

The modifier 20, described in greater detail below, is sized and shaped to fit within the film gate 18 between the film 16 and the shutter of the camera 10. A conventional, spring-loaded, film pusher plate 21 which is usually mounted to the inside surface of the door (not shown) of the camera (used to access the film) lightly pushes the film flat across the film gate 18, and adjacent a rear surface of the modifier 20.

Referring to FIGS. 2a through 2c, the modifier 20, in accordance with one embodiment of the invention includes a transparent plate 22 and a diffusion pattern 24. The transparent plate 22 is preferably shaped to include a raised (or thicker) center section 26 which defines two (thinner) edge sections 28. The edge sections 28 are designed to contact portions of the camera positioned adjacent to the film gate 18 to hold the entire modifier 20 in the camera with the center section positioned within the film gate 18 of the camera 10, as shown in cross-section in FIG. 2c.

The diffusion pattern 24 functions as a translucent mask by diffusing and distorting the incident light prior to it reaching and exposing the film. The diffusion pattern 24 preferably does not prevent the light from reaching the film (i.e., the pattern is not opaque). The transparent plate 22 of the modifier 20 is preferably made from an optical-grade plastic, however, optical grade glass may also be used. The diffusion pattern 24 is preferably formed on a rear surface 30 (facing the film 16 when installed in the camera 10) of the transparent plate 22.

A preferred method of forming the diffusion pattern 24 is to emboss the particular pattern (or its negative or reverse) into the rear surface of the plastic transparent plate 22. A reverse pattern is first machined into a stamping surface of a hard material. The plastic transparent plate 22 is then softened (by using flameless heat, such as steam or electric filament or through the use of other indirect heating) and pressed against the stamping surface so that the pattern is transformed into the rear surface of the plastic plate 22, thereby creating the diffusion pattern 24. When incident light rays pass through the modifier 20 and strike a portion of the diffusion pattern 24, the particular rays are scattered or diffused somewhat randomly, but are not blocked, prior to the light reaching and exposing the film.

The diffusion pattern 24 effectively distorts the incoming light, and therefore also the image, in a controlled manner. The distortion of the image follows the particular diffusion pattern 24 which is discernable, because the transparent plate 22 and the pattern 24 are both located at the film plane (also called the focal plane) and are in soft focus (not sharp). The pattern 24 appears somewhat softened (not in sharp focus) because although the pattern 24 is effectively at the point of focus, the pattern 24 is not a mask (not opaque), but a light diffuser which disperses the incident light by a small amount just before it reaches and exposes the film. This controlled dispersion of the light aids in achieving the desired special effect to the exposed image, as discussed below.

It is preferable that the modifier 20 be located as close to the surface of the film as physically possible. If the modifier 20 is the type which is stationary with respect to the camera, as shown in FIGS. 2a–2c and discussed above, it is preferable that the modifier not make contact with the film, to avoid unwanted scratches as the film is advanced.

There are several embodiments for positioning the modifier 20 within the film gate 18 and adjacent to the focal plane of a camera. These are described as follows, referring to FIGS. 3 through 14.

Figure 3:
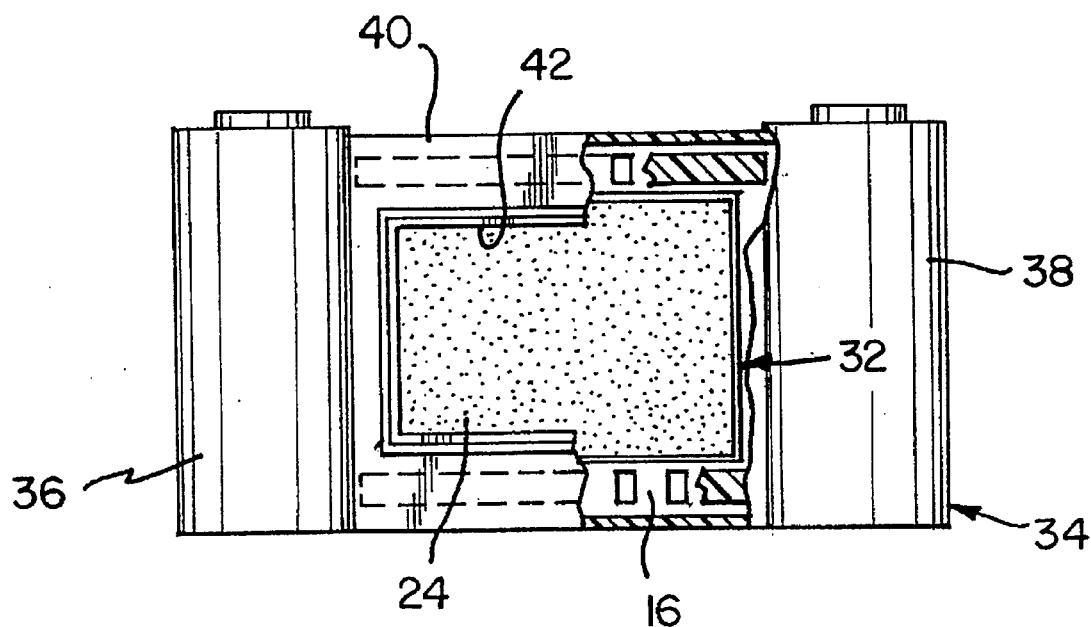
FIG. 3 is a partially sectional front view of a film cassette employing a optical modifier plate, in accordance with another embodiment of the invention.
Figure 4:
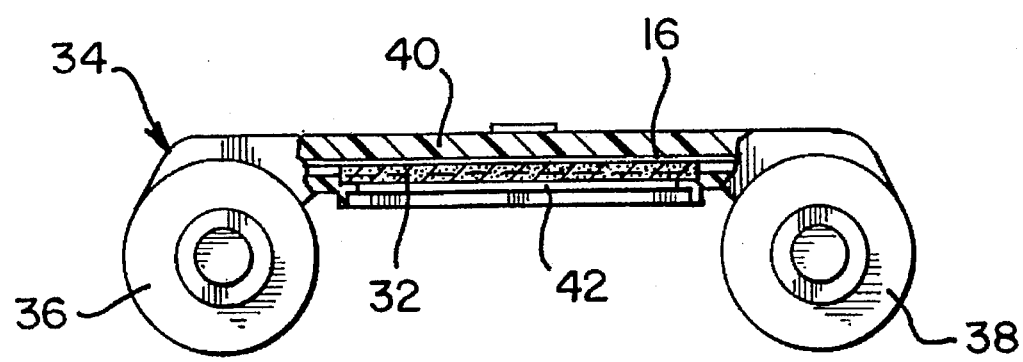
FIG. 4 is a partially sectional top view of the film cassette shown in FIG. 3.

Referring to FIGS. 3 and 4, an optical modifier 32 in accordance with the invention is incorporated into the structure of an otherwise convention film cassette 34 (typically referred to as film-type 120). The cassette 34 includes a film supply section 36, a film pick-up section 38, and a connecting portion 40 connecting the film supply section 36 with the film pick-up section 38. The connecting portion 40 includes an integral film gate 42 which aligns with the film gate of the camera (not shown) which is adapted to receive the cassette 34. The modifier 32, in this embodiment, is preferably positioned (during manufacture of the cassette 34) within the structure which makes up the connecting portion 40 so that it lies across the film gate 42 and adjacent the film 16.

The modifier 32, as in the above-described embodiment of FIGS. 1 and 2a–2c, includes a specific diffusion pattern 24. The position of the modifier 32 forces all light passing through the film gate 42 to also pass through the modifier and become slightly diffused prior to the light reaching and exposing the film 16.

Figure 5:
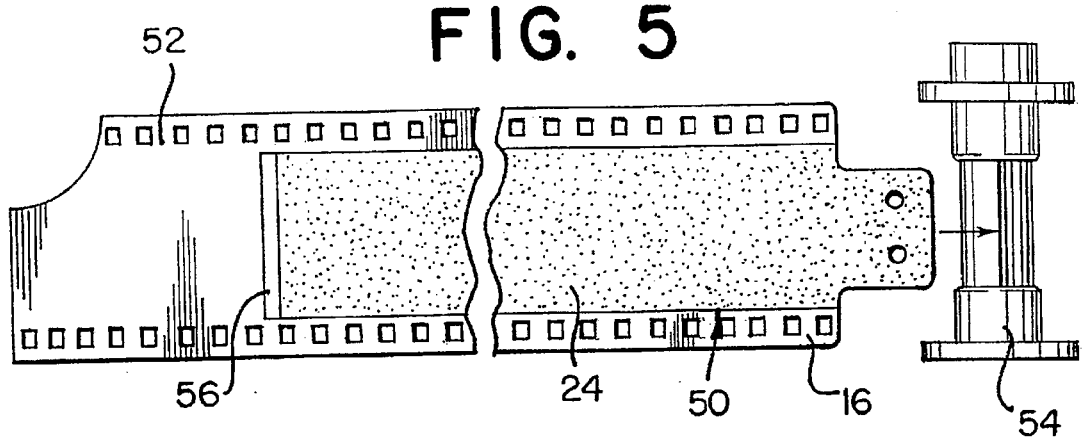
FIG. 5 is a front partial view of a film strip, optical modifier strip, and film bobbin, in accordance with another embodiment of the invention.
Figure 6:
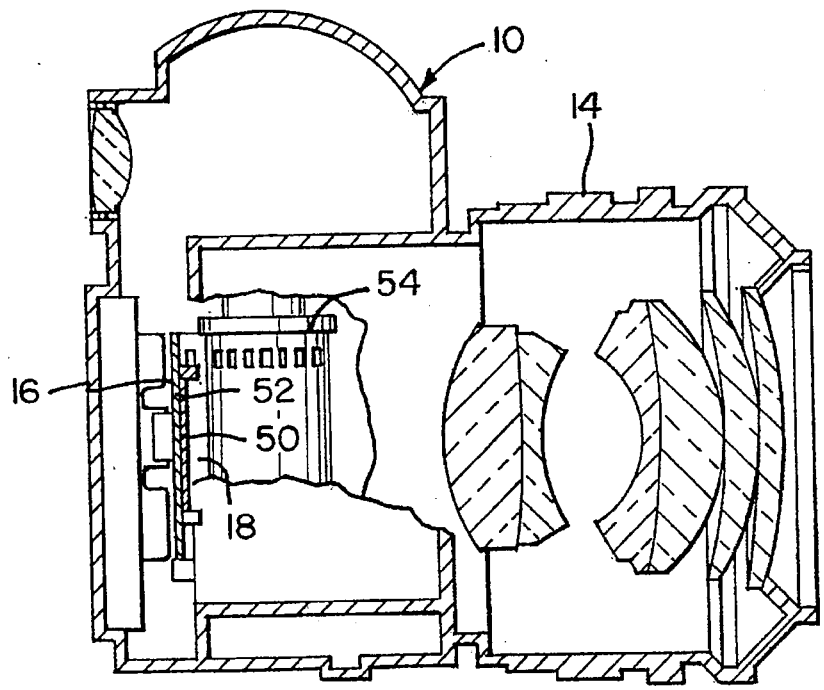
FIG. 6 is a sectional side view of a camera with the film strip, optical modifier strip and film bobbin of FIG. 5 in an operative position.

Referring to FIGS. 5 and 6, a modifier 50, in accordance with another embodiment of the invention is shown. Here, the modifier 50 takes the form of a thin translucent plastic strip (similar to the substrate material used in photographic film). The strip modifier 50 is affixed to the inside surface 52 (emulsion side) of an otherwise conventional roll of film 16 (type 35 mm). Both the film 16 and the affixed strip modifier 50 are rolled up together into the standard film canister (not shown) using the standard spool 54. It is preferred that the strip modifier 50 be attached only at selected points 56 such as the ends of the strip modifier 50 or perhaps between each frame (not shown) using a heat bond or an appropriate adhesive.

FIG. 6 illustrates (in cross-section) a conventional SLR camera 10 (similar to the camera 10 shown in FIG. 1), having the film 16 of FIG. 5 installed. The strip modifier 50 is shown positioned in front of the film 16 (closer to the lens 14) and across the film gate 18.

Figure 7:
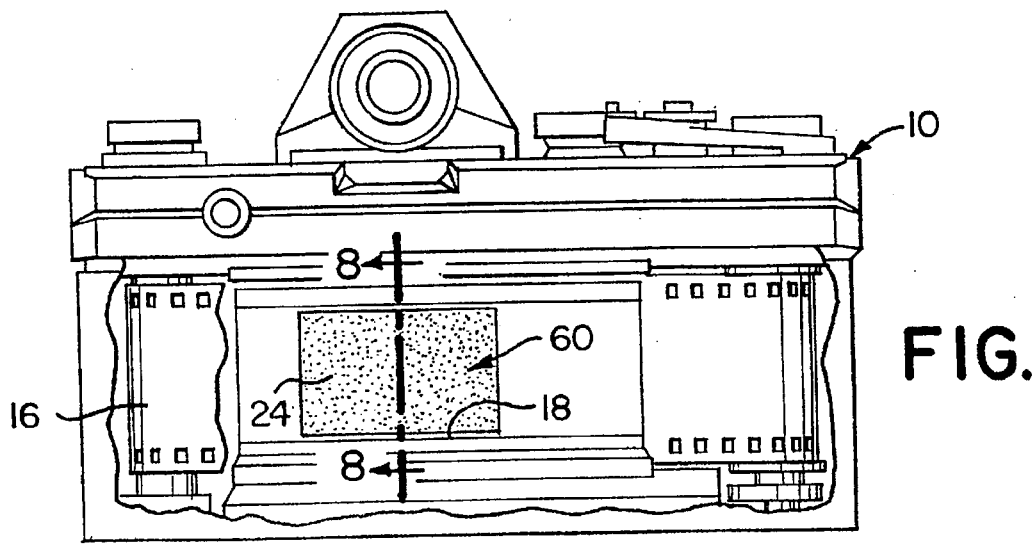
FIG. 7 is a rear view of the camera shown in FIG. 6.
Figure 8:
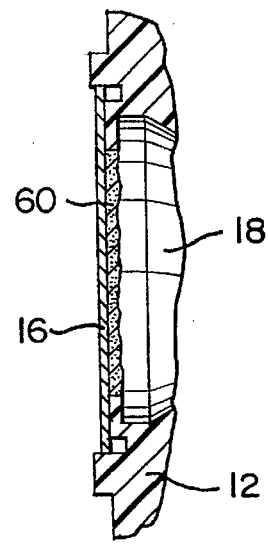
FIG. 8 is a partial side sectional view, taken along the lines 8—8 of FIG. 7, showing details of the film strip and the optical modifier strip at a film plane of the camera.
Figure 9:
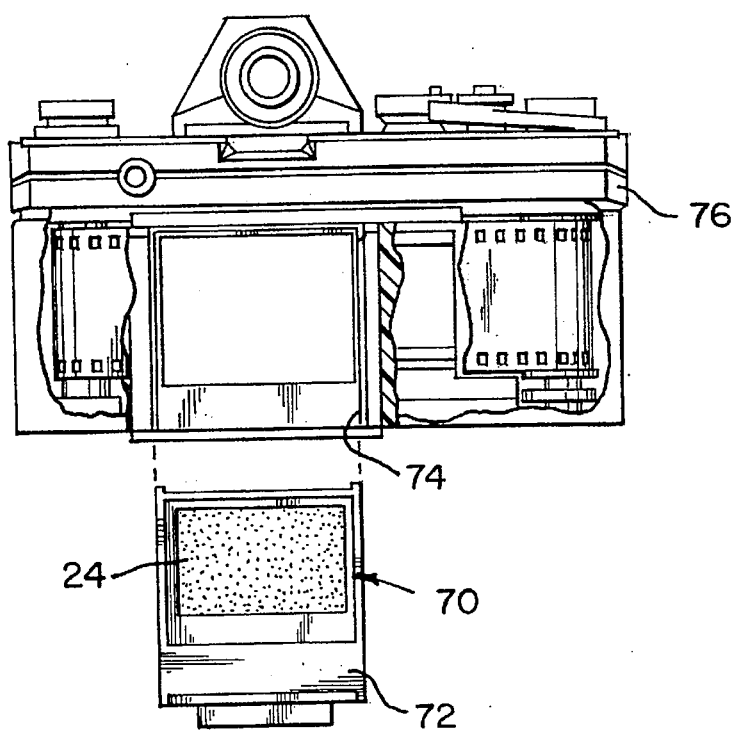
FIG. 9 is a sectional rear view of a camera showing an optical modifier cartridge in a non-operative position, in accordance with another embodiment of the invention.
Figure 10:
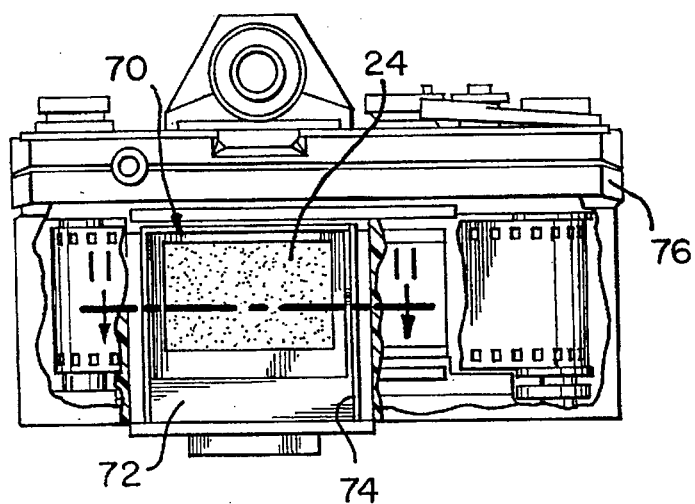
FIG. 10 is a sectional rear view of the camera of FIG. 9 showing the optical modifier cartridge in an operative position, in front of the film gate.

FIGS. 7 and 8 illustrate an optical modifier 60 in accordance with another embodiment of the invention which is similar to the modifier shown in FIGS. 2a–2c and discussed above. However, in this embodiment, the modifier 60 is the same size of the film gate 18, i.e., the modifier 60 does not include the edge sections 28. The modifier 60 is positioned permanently within the film gate 18 using an appropriate adhesive, for example. The modifier 60 may also snap into place within the film gate 18 using a close tolerance fit or appropriate ridges and/or detents. The modifier 60 shown in this embodiment is especially useful for disposable type cameras.

Figure 11:
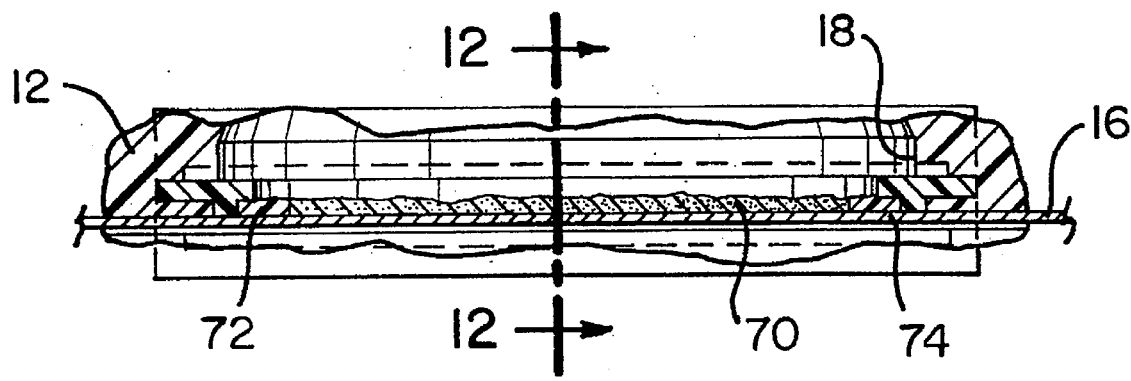
FIG. 11 is a partial top sectional view, taken along the lines 11—11 of FIG. 10, showing details of the film strip and the optical modifier cartridge at the film plane of the camera.
Figure 12:
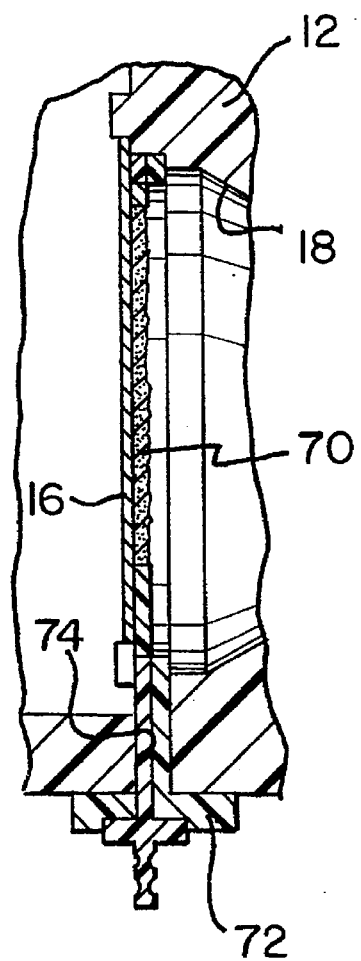
FIG. 12 is partial side sectional view, taken along the lines 12—12 of FIG. 11, showing details of film strip guides and the optical modifier cartridge (inserted)

Referring to FIGS. 9 through 12, yet another optical modifier 70 in accordance with the invention is shown. The modifier 70 is mounted into the frame structure of a cartridge 72. The cartridge 72 is a thin plate which is adapted to be inserted into a slot 74 located in a camera 76. The camera 76 is either specially made with the slot 74 or a replaceable camera back (not shown) may be provided having a slot 74. In either case, the slot 74 positions the cartridge 72 so that the modifier 70 (mounted within the cartridge 72) aligns into a position between the film gate 18 and the film 16, as shown in FIGS. 11 and 12. One of a variety of cartridges 72 (each having a different modifier 70) may be inserted into the slot 74. Each cartridge 72 preferably includes a handle which remains accessible when the cartridge 72 is inserted into the slot 74. The slot 74 and/or the insertable cartridge 72 includes an appropriate light-barrier to prevent unwanted light from entering the camera through the slot opening and exposing the film.

Figure 13:
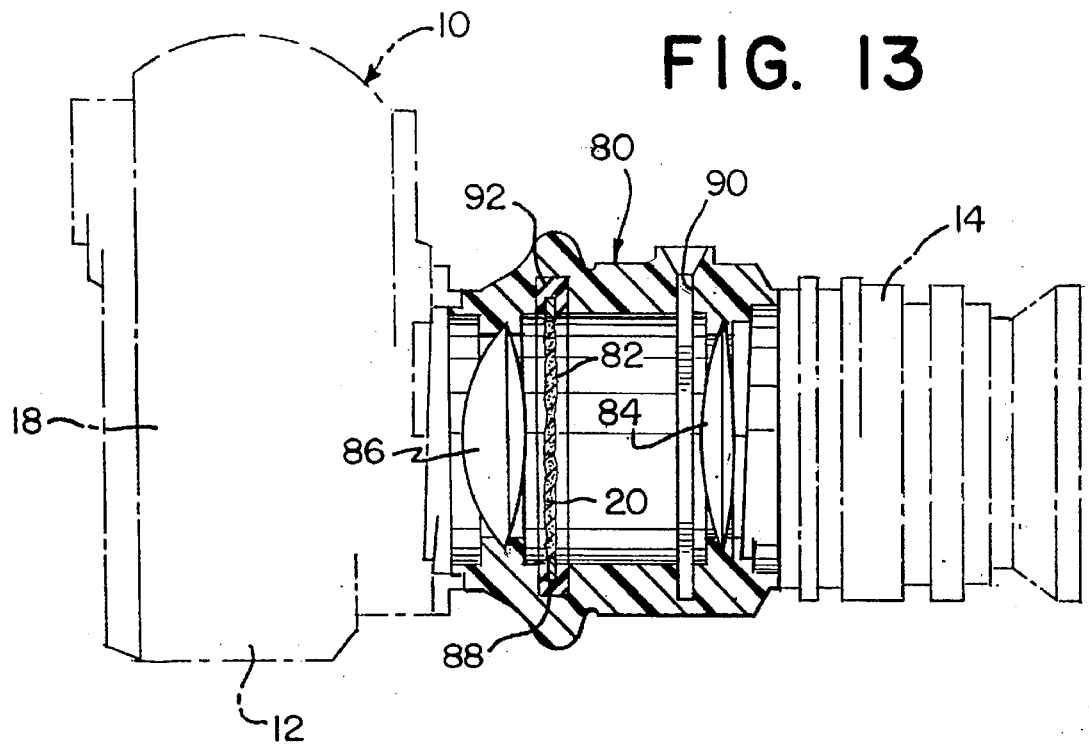
FIG. 13 is a sectional side view of a modifier holder connected between a camera body and a lens assembly (both shown in phantom), in accordance with another embodiment of the invention.
Figure 14:
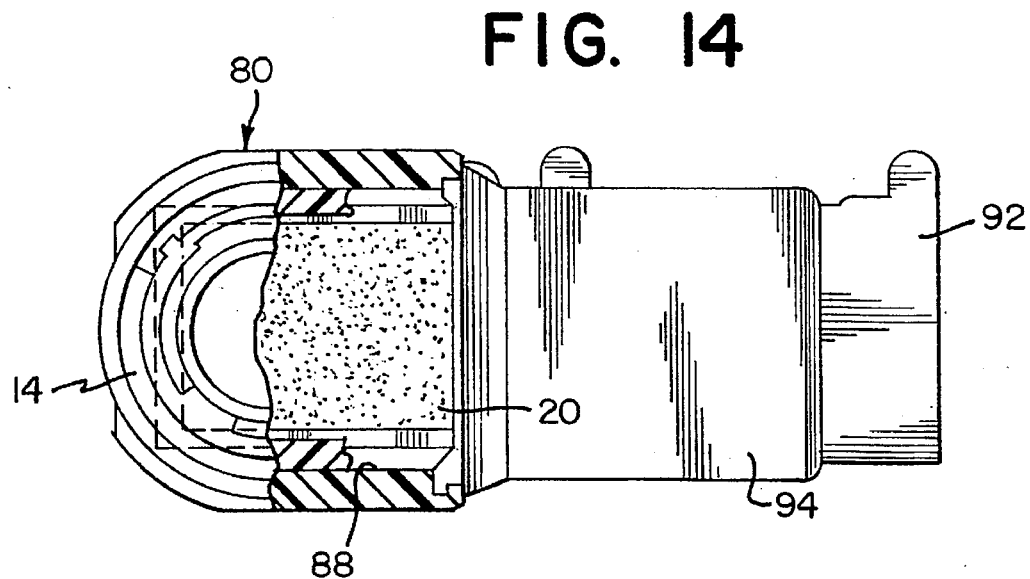
FIG. 14 is a partial sectional side view of the modifier holder of FIG. 13.
Figure 15:
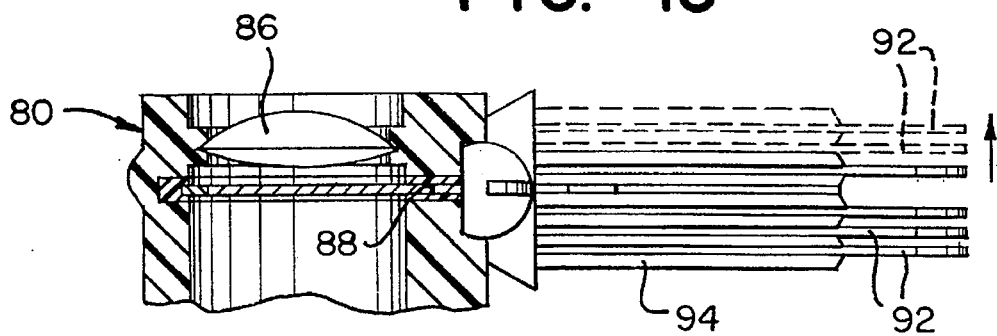
FIG. 15 is a partial sectional view of the modifier holder of FIG. 14.

Referring to FIGS. 13 through 15, another embodiment of the invention is shown. In this embodiment, a modifier coupler 80 is positioned between the camera body 12 and the lens assembly 14. The modifier coupler 80 couples the lens assembly 14 to the camera body 12 and passes the incoming light from the lens assembly 14 to the film gate 18 of the camera 10. The modifier coupler 80 includes an image plane 82, a primary lens assembly 84, a secondary lens assembly 86, a modifier receiving slot 88, and a filter receiving slot 90.

In this particular embodiment, each of several different modifiers 20 is mounted to a plate 92. Several selected plates 92 are mounted to a plate holder 94, as shown in FIG. 14. The plate holder 94 is adapted to be mounted to the modifier coupler 80, adjacent the modifier receiving slot 88. The plate holder 94 is mounted so that it may slide relative the modifier coupler 80 in such a manner that allows any selected one of the several plates 92 held in the plate holder 94 to align with the modifier receiving slot 88. The selected plate 92, once aligned with the modifier receiving slot 88, may be moved into the modifier coupler 80 so that the selected modifier 20 aligns with the path of incoming light from the lens assembly 14. A selected plate 92 is shown in an inserted position in FIGS. 14 and 15. Other light modifiers such as conventional filters may be inserted into the filter receiving slot 90.

As light enters the lens assembly 14, the internal lenses of the lens assembly 14 and the primary lens assembly 84 will focus the reflected light of a subject onto the image plane 82 of the coupler 80 (the image will be inverted). The inverted image is modified by the selected modifier 20 located at the image plane 82. From here the secondary lens assembly 86 re-focuses the image (and uprights the image) onto the film plane which is located at the film gate 18 of the camera 10.

An important feature of the invention, as shown in each of the above-described embodiments, is that the modifier 20, however it is introduced into the image light path, is located as close as possible to the focal plane of the camera 10 regardless of the location of the focal plane with respect to the film plane. As illustrated in the above embodiment (FIGS. 13–15), although a single focal plane is usually located at the film plane, it is possible to create two effective focal planes, one located a prescribed distance from the film plane towards the subject, the other located at the film plane 18.

Figure 16:
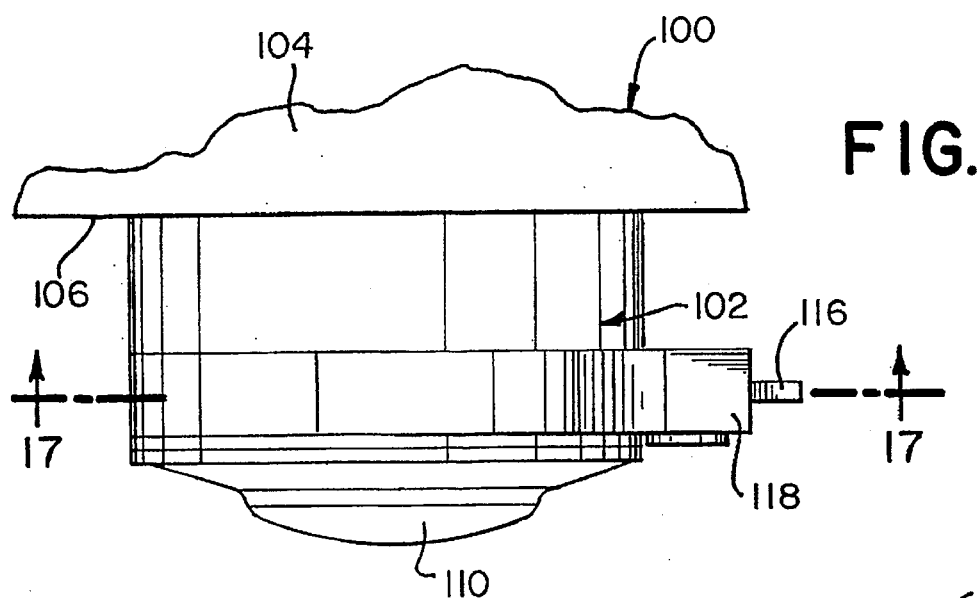
FIG. 16 is a top view of a disposable camera showing an optical modifier assembly in accordance with yet another embodiment of the invention.
Figure 17:
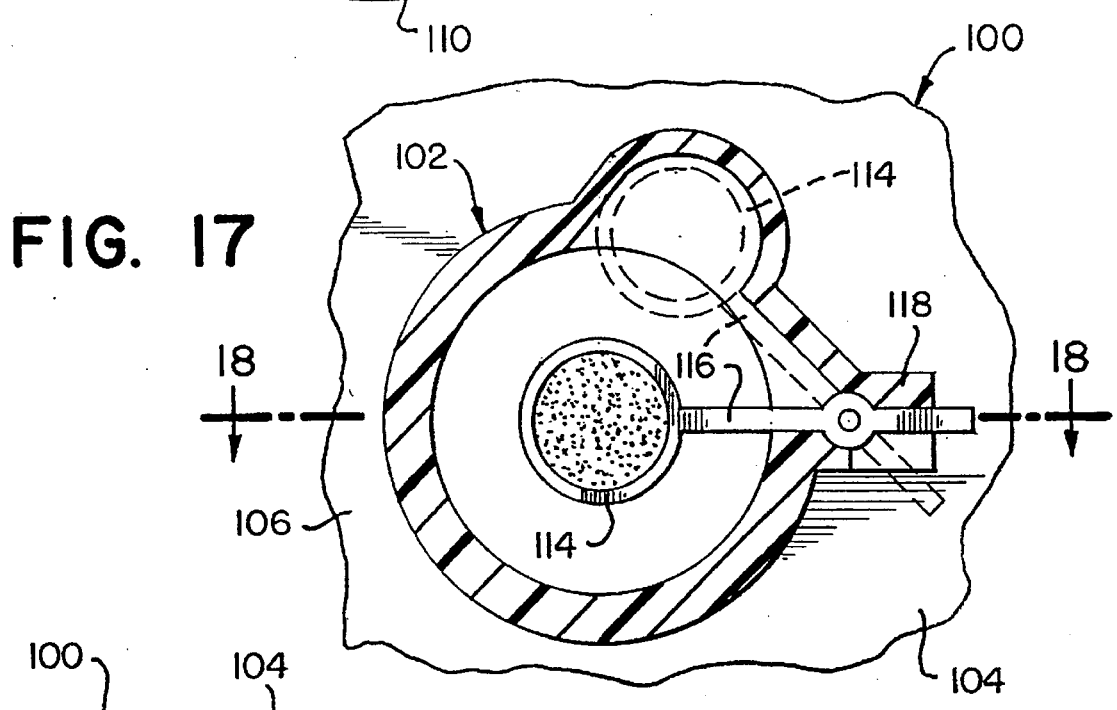
FIG. 17 is a partial sectional plan view of the camera and optical modifier assembly of FIG. 16, taken along the lines 17—17 of FIG. 16.
Figure 18:
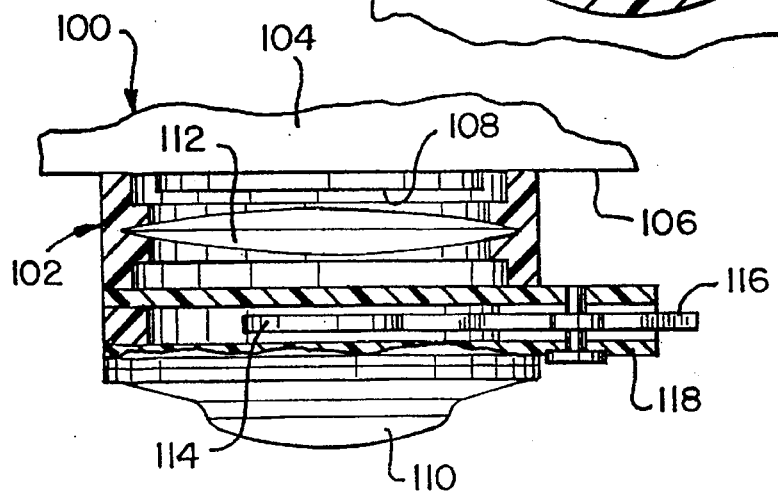
FIG. 18 is a partial sectional top view of the optical modifier assembly of FIG. 16, showing details of the optical modifier assembly, taken along 18—18 of FIG. 17.

Referring to FIGS. 16–18, a camera 100 having an optical modifier assembly 102 is shown, in accordance with another embodiment of the invention. The camera 100, in this particular embodiment is intended to be a disposable type made using relatively inexpensive parts and including a built-in supply of film. The camera 100 in this embodiment, of course may likewise be a non-disposable type.

The camera 100 includes a camera body 104 having a front face 106 and a lens aperture 108. The commercially available conventional disposable camera (i.e., one not including the modifier assembly of this invention) includes a lens (not shown) mounted within the lens aperture 108. The conventional lens (not shown) focuses a subject located in front of the camera, onto a frame of film located at the film plane (located in the rear of the camera). During the manufacture of these disposable cameras 100, applicant contemplates replacing the conventional lens (not shown) with the optical modifier assembly 102.

As shown in cross-section in FIG. 18, the optical modifier assembly 102 includes a first outer lens 110 located farthest from the film plane, and a second inner lens 112 located adjacent the front face 106 of the camera 100. An optical modifier 114 is located and movable within a plane lying between the inner and outer lenses (112, 110) and parallel to the film plane of the camera 100. The outer lens 110 focuses the light reflected off a subject located in front of the camera onto an intermediate focal plane 115. The inner lens 112 focuses the image located at the intermediate focal plane 115 onto the film plane. It is desirable to position the optical modifier 114 close to the intermediate focal plane so that the distortion applied to the light from the subject may be recorded on film in sharp focus (that is, as focused as the diffusion of the passing light through the modifier will allow).

As shown in FIG. 17, the optical modifier 114 is mounted to an arm 116. The arm 116 is pivotally connected to a housing 118 of the optical modifier assembly 102. A portion of the arm 116 is accessible to the user of the camera 100 and may be displaced, moving the optical modifier 114 between a stowed position (shown in FIG. 17 in dashed lines) wherein the incoming light passes directly to the film and is not otherwise distorted (except by the lenses), and an interference position wherein the optical modifier 114 is located in the path of the light (shown in FIG. 17, in solid lines).

Figure 19:
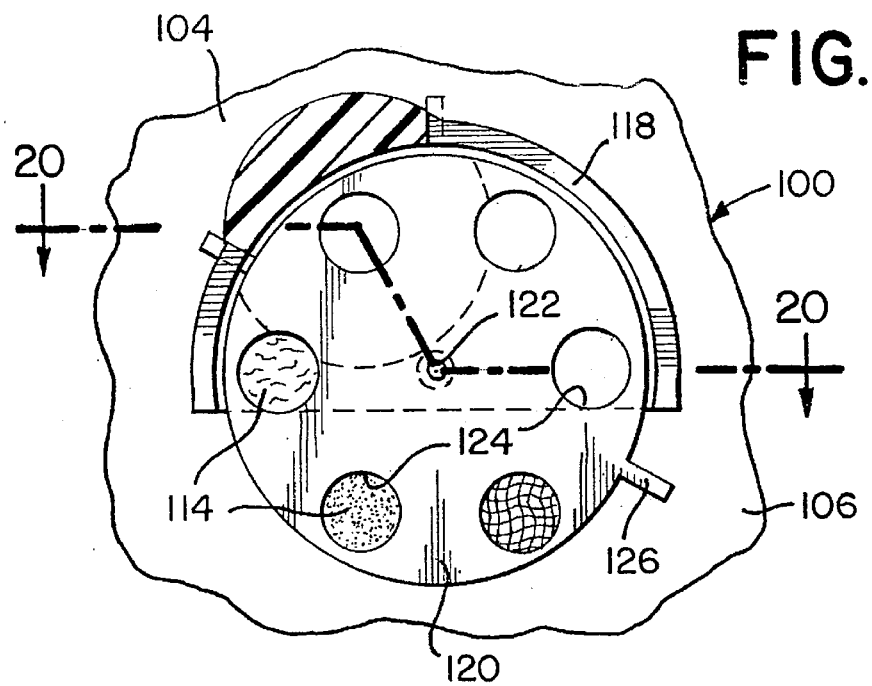
FIG. 19 is a partial sectional front view of an optical modifier, in accordance with yet another embodiment of the invention.
Figure 20:
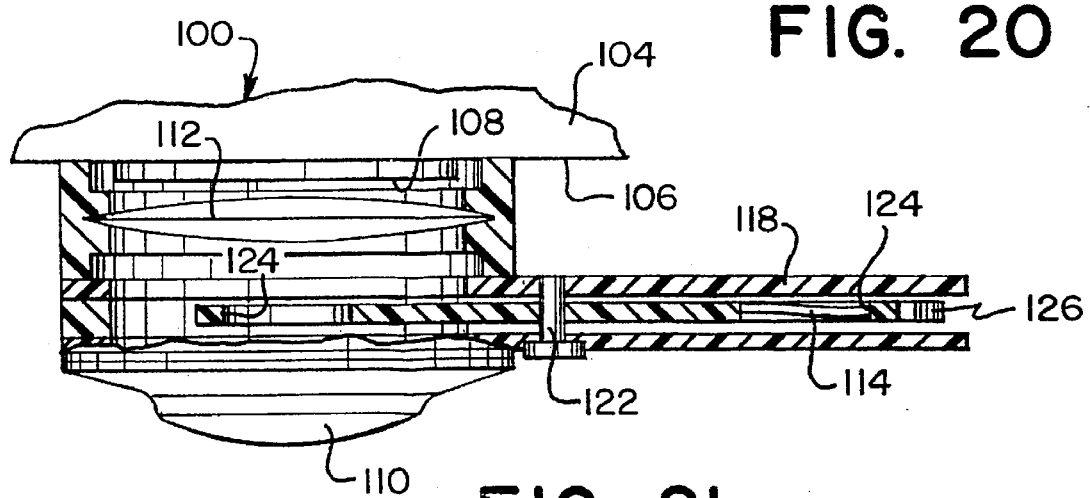
FIG. 20 is a partial sectional view of the optical modifier of FIG. 19, taken along the lines 20—20 of FIG. 19.

Referring to FIGS. 19–20, a preferred embodiment of the invention, as applied to disposable cameras, is shown, wherein the optical modifier 114 is mounted along the edge of a disc 120. The disc 120 is pivotally attached to the body of the camera 100 at a central pivot point 122. The disc 120 includes several peripheral openings 124 which include one of several different optical modifiers 114 for achieving different effects. The disc 120 is mounted so that any one of the openings 124 may be positioned in front of the lens aperture 108. The operator of the camera 100 may select a particular effect by rotating the disc 120 until the appropriate optical modifier 114 aligns with the lens aperture 108. A lever 126 may be provided for assisting in the rotation of the disc 120. Also, an indicator (not shown) may be included to point to indicia located on the face of the camera body, for example, indicating the particular effects in use.

Figure 21:
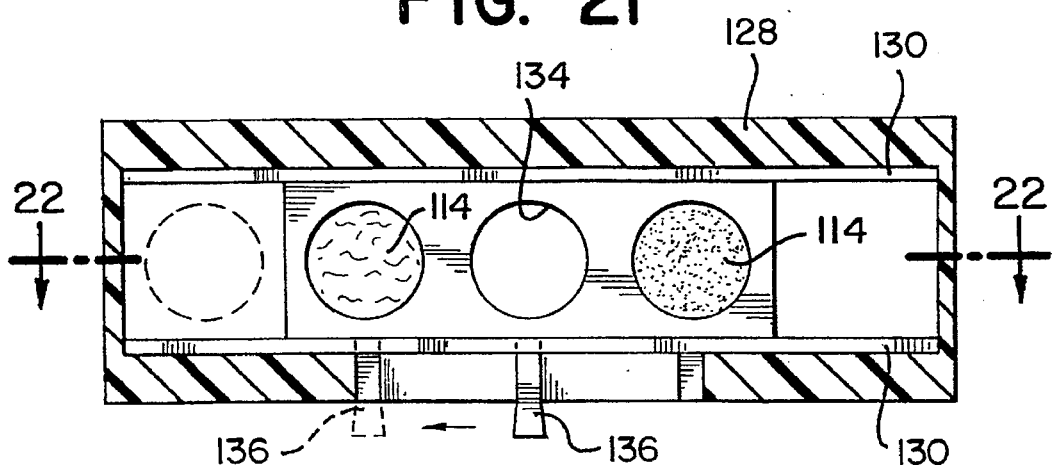
FIG. 21 is a sectional view of an optical modifier holder, in accordance with yet another embodiment of the invention.
Figure 22:
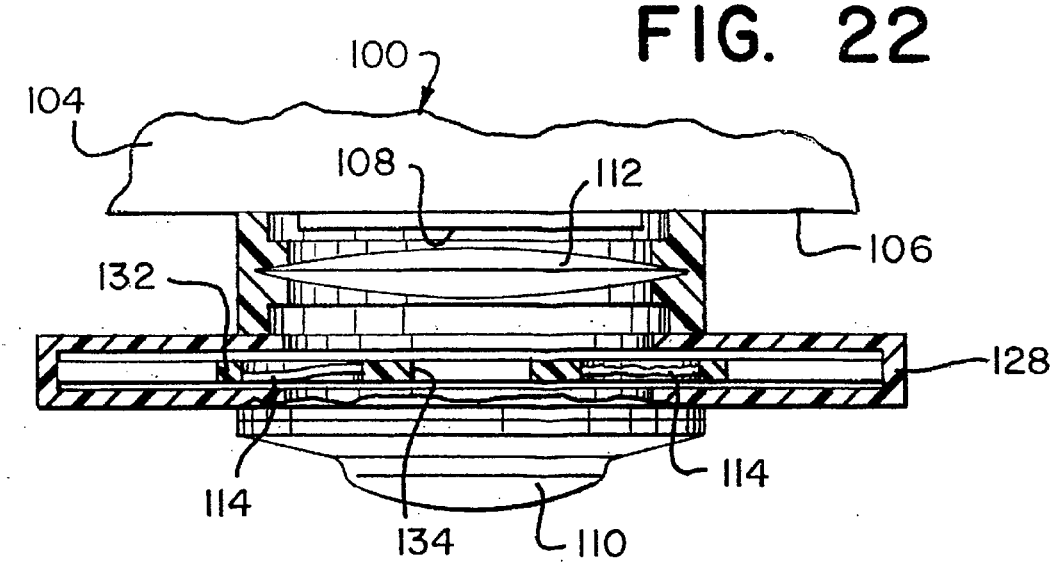
FIG. 22 is a partial sectional view of the optical modifier holder of FIG. 21, taken along the lines 22—22 of FIG. 21.

Referring to FIGS. 21–22, another embodiment of the invention is shown wherein the optical modifier 114 is mounted onto an elongated panel 128. The panel 128 include two parallel internal edges 130 which define an elongated window. Several sliding plates 132 are slidably positioned between the two edges 130. The panel 128 is mounted to the front face of the camera 100 so that each plate 132 may be selectively moved between a stowed position and a usable position, located in front of the lens aperture 108. Each plate 132 includes an opening 134 across which lies one of several different optical modifiers 114. Each plate 132 preferably includes an accessible handle 136 which may be grasped by the camera operator to move the plates 132 with respect to the lens aperture 108, as necessary.

Figure 23:
FIG. 23 is a representative illustration of a photograph showing two flowers.
Figure 24:
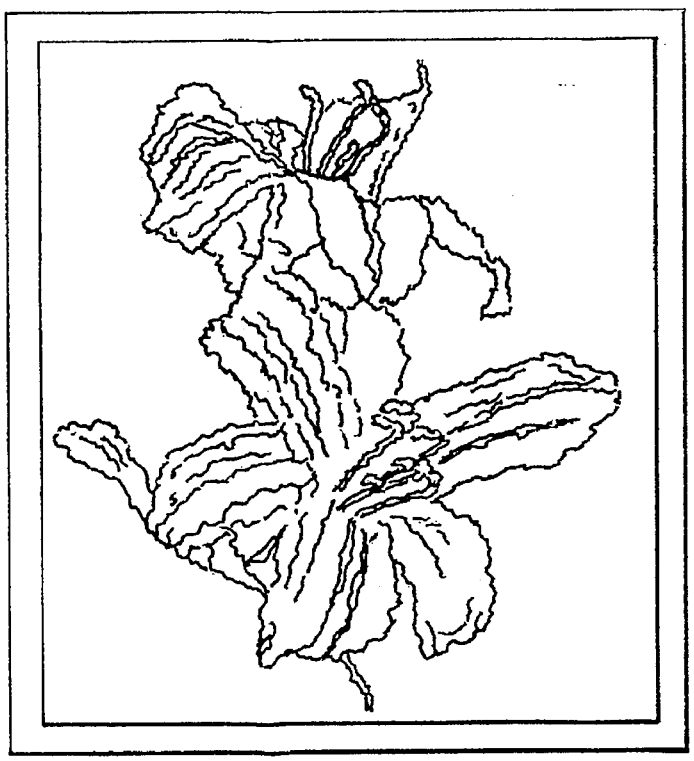
FIG. 24 is a representative illustration of a photograph showing two flowers whose image light has been diffused by one of the optical modifiers, in accordance with the invention.
Figure 25:
FIG. 25 is a representative illustration of a photograph showing two flowers whose image light has been diffused by another optical modifiers, in accordance with the invention.

As way of example, a representation of a non-modified photograph (of two flowers) is shown in FIG. 23. One purpose of the invention is to modify the image of a subject (i.e., the light reflected from the subject entering the camera) to introduce visual characteristics indicative of a painting. One particular optical modifier 114 modifies the image to introduce an impressionistic appearance, as shown in FIG. 24. Here, all the detail is distorted, yet the image remains substantially in focus. Another optical modifier 114 introduces a "craquelure" effect (typical of old oil-base paintings) to the original flower image so that the resulting print resembles FIG. 25.

Of course, a variety of painting characteristics may be introduced as an optical modifier or effect using the modifiers of the present invention.

Another embodiment, similar to the one shown in FIGS. 19 and 20 and described above, is shown in FIGS. 26–28 and includes a modifier housing 200, a modifier turret 202, and a primary-lens housing 204. The modifier housing 200 is preferably formed integrally with a face of a disposable-type camera 206, yet could also be formed separately and adapted to attach to a face of any camera 206 to be used as a camera attachment. The modifier housing 200 includes a front wall 208 and an aperture 210 which is aligned with the primary-lens aperture 212 of the camera 206. A secondary-lens tube 214 is located behind the front wall 20 and preferably includes an appropriate lens (not shown) which is designed to re-focus an image located at an intermediate focal plane 216 onto the film. The intermediate focal plane 216 is preferably located just in front of the front wall 208, at the location of the modifier turret 202.

As shown in FIG. 27, the modifier turret 202 is pivotally connected to a portion of the modifier housing 200 at a pivot pin 218. The modifier turret 202 is rotatable about the pivot pin 218.

The primary-lens housing 204 is preferably fixed relative to the camera 206 and the modifier housing 200 by the pivot pin 218 or by being formed integrally with (or otherwise connected to) the camera 206. The primary-lens housing 204 supports a primary lens 220. The primary lens 220 is designed to focus the incoming light reflected from an image in front of the camera to the intermediate focal plane 216. The primary lens 220 may be mounted in a primary-lens tube 222.

The modifier turret 202 includes at least two openings 224, as shown in FIG. 28. One opening 224 may include an optical modifier 226, for example. The other opening (or openings) shown in FIG. 28, may be left open, include a clear element 227 or a translucent element having a frosted surface or include another optical modifier element. Other variations of the modifier turret are possible including several different modifiers such as one for producing "craquelure", impressionism, or other painting-related effects.

As shown in FIG. 28, the modifier turret 202 preferably further includes indicia 228 or other indication of the type of modifier (or lack thereof) in use. The primary-lens housing 204 may further include an indicator opening 230 which aligns with the indicia printed on the modifier turret 202 so that an operator may view the indicia 228 to learn which modifier, if any, is located in the path of incoming light and will effect the film.

The turret 202 further includes a rubber O-ring 232 along its periphery to ensure high friction for positive gripping while being rotated by an operator. The O-ring is shown in FIG. 27. Other gripping peripheral surfaces include a roughened edge (not shown) and serrations 234 shown in FIG. 28, in place of the rubber O-ring 232 of FIG. 27.

In operation, the operator rotates the modifier turret 202 while viewing indicia 228 through the indicator opening 230 until a desired modifier effect is indicated. When the appropriate modifying effect is indicated through the indicator opening 230, the modifier will be in position in front of the primary lens 220 and will effect the film accordingly.

What is claimed is:

1. An attachment for a camera for altering the collective light of an image prior to said image being recorded onto film, said camera having a lens aperture, a frame of film located at a film plane, and a lens, said attachment comprising:

a transparent modifier positionable adjacent to said film plane; and means for distorting light, said distortion means being located on and formed integral with a surface of said transparent modifier, said distortion means being transparent so that light from said image is distorted at said focal plane thereby creating a distorted image which is recorded by said film;

wherein said camera includes a shutter being operational within a film gate and wherein said transparent modifier is a semi-rigid plate and is sized and shaped to fit within said film gate between said shutter and said film.

2. The camera attachment according to claim 1, wherein said semi-rigid transparent plate includes detents which are positioned to engage a portion of said camera in such a manner as to retain said transparent plate within said film gate.

3. A film for use with a camera, said film comprising:

an elongated plastic substrate having a light sensitive emulsion; and, an elongated plastic translucent modifier attached to a portion of said plastic substrate in an overlapping relationship so that at least a portion of light directed at said film is modified prior to reaching said emulsion by said translucent modifier;

wherein said plastic substrate and said translucent modifier are thin strips adapted to be rolled together on a spool and dispensed therefrom as necessary, once installed into a camera.

4. A disposable-type camera, comprising:

a body having a front face and a rear face;

a film plane located adjacent said rear face;

a intermediate focal plane located a predetermined distance in front of said film plane;

a first lens located in from of said intermediate focal plane, said first lens adapted to focus light from an image onto said intermediate focal plane;

a transparent optical modifier located at said intermediate focal plane, said modifier adapted to selectively modify at least a portion of said light from said image;

a second lens located between said intermediate focal plane and said film plane, said second lens adapted to focus said modified image from said intermediate focal plane onto said film plane.

5. The disposable-type camera according to claim 4, further comprising means for moving said transparent optical modifier between a first position wherein said modifier modifies a portion of said light from said image and a second position wherein said light from said image reaches said film without modification.

6. The disposable-type camera according to claim 4, further comprising a second transparent optical modifier and including means for positioning one of said first and said second transparent optical modifiers into said intermediate focal plane so that said selected optical modifier modifies at least a portion of said light from said image prior to said light exposing said film.

7. The disposable-type camera according to claim 6, wherein said first and second transparent optical modifiers are both mounted on a movable transport member which may be moved within said intermediate focal plane between a first position wherein said first optical modifier modifies at least a portion of said light from said image and a second position wherein said second optical modifier modifies at least a portion of said light from said image.

8. The disposable-type camera according to claim 7, wherein said transport member further includes a position wherein said light from said image reaches said film without modification.

9. An attachment for a camera for altering the collective light of an image prior to said image being recorded onto film, said camera having a lens aperture, a frame of film located at a film plane, and a lens, said attachment comprising:

an intermediate focal plane located a predetermined distance from said film plane between said film plane and said image;

means for focusing said collective light of said image onto said intermediate focal plane;

a transparent optical modifier located at said intermediate focal plane;

means for distorting light, said distortion means being located on and formed integral with a surface of said transparent optical modifier, said distortion means being transparent so that light from said image is distorted at said intermediate focal plane to create a focused distorted intermediate image; and means for refocusing said focused distorted intermediate image from said intermediate focal plane to said film plane.

10. The camera attachment according to claim 9, further comprising means for moving said transparent optical modifier between a first position wherein said modifier modifies a portion of said light from said image and a second position wherein said light from said image reaches said film without modification.

11. The camera attachment according to claim 9, further comprising a second transparent optical modifier and including means for positioning one of said first and said second transparent optical modifiers into said intermediate focal plane so that said selected optical modifier modifies at least a portion of said light from said image prior to said light exposing said film.

12. The camera attachment according to claim 11, wherein said first and second transparent optical modifiers are both mounted on a movable transport member which may be moved within said intermediate focal plane between a first position wherein said first optical modifier modifies at least a portion of said light from said image and a second position wherein said second optical modifier modifies at least a portion of said light from said image.

13. The camera attachment according to claim 12, wherein said transport member further includes a position wherein said light from said image reaches said film without modification.

14. The camera attachment according to claim 13, wherein said transport member is a turret which is rotatable about a pivot point.

15. The camera attachment according to claim 13, wherein said transport member is an elongated plate which is slidable between said first and second positions.

* * * * *